(12) United States Patent
Kojima et al.

(10) Patent No.: US 6,505,004 B2
(45) Date of Patent: Jan. 7, 2003

(54) PHOTOMETRIC APPARATUS FOR MICROSCOPE

(75) Inventors: Jitsunari Kojima, Hachioji (JP); Kazuhiko Tsubota, Komagane (JP); Keiichi Iizuka, Ina (JP); Tetsuo Tatsuda, Ina (JP); Ri Sei, Hachioji (JP); Tomohiro Uchida, Hachioji (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 10/085,532

(22) Filed: Feb. 27, 2002

(65) Prior Publication Data

US 2002/0090218 A1 Jul. 11, 2002

Related U.S. Application Data

(62) Division of application No. 09/427,950, filed on Oct. 27, 1999, now Pat. No. 6,385,403.

(30) Foreign Application Priority Data

Oct. 30, 1998 (JP) ............................................ 10-310763

(51) Int. Cl.[7] .............................................. G02B 21/36
(52) U.S. Cl. ......................................... 396/432; 348/79
(58) Field of Search .............................. 396/432; 348/79

(56) References Cited

U.S. PATENT DOCUMENTS

| | | | |
|---|---|---|---|
| 4,912,495 A | | 3/1990 | Ishikawa et al. |
| 4,985,726 A | | 1/1991 | Fujibayashi et al. |
| 5,682,567 A | * | 10/1997 | Spruck et al. ............... 359/368 |
| 5,687,416 A | * | 11/1997 | Otaki et al. .................. 396/432 |
| 5,748,996 A | | 5/1998 | Lee |
| 6,385,403 B1 | * | 5/2002 | Kojima et al. ............... 396/233 |

FOREIGN PATENT DOCUMENTS

| | | |
|---|---|---|
| JP | 56-89023 A | 7/1981 |
| JP | 56-155820 A | 12/1981 |
| JP | 61-144443 U | 9/1986 |
| JP | 6-222282 A | 8/1994 |
| JP | 7-168103 A | 7/1995 |

* cited by examiner

Primary Examiner—David M. Gray

(57) ABSTRACT

A photometric apparatus for a microscope comprises a light-reception element having a plurality of concentrically arranged photometric measurement areas, the light-reception element receiving observation light from the microscope and measuring a brightness of an observation image of the observation light, a calculation circuit for calculating an exposure time necessary for photographing the observation image, on the basis of a photometric measurement value obtained from at least one of the photometric measurement areas of the light-reception element, and a control circuit for performing an exposure operation on the basis of the exposure time calculated by the calculation circuit.

7 Claims, 7 Drawing Sheets

PHOTOMETRIC APPARATUS FOR MICROSCOPE

This is a Division of application Ser. No. 09/427,950 filed Oct. 27, 1999, now U.S. Pat. No. 6,385,403.

BACKGROUND OF THE INVENTION

The present invention relates in general to a photometric apparatus for a microscope, which measures the brightness of a microscopic image, and calculates and determines an exposure time for photographic imaging in accordance with the measured brightness.

Conventionally, microscopes capable of observing minute samples, photographing an observed image or recording a video image have been used in a variety of areas ranging from biological researches to industrial inspections. In particular, in cases of photographing and recording observation images, photographing devices custom-designed for microscopes are normally used. The photographing devices for microscopes are generally provided with so-called automatic exposure functions for measuring the brightness of observation images and automatically calculating exposure time in accordance with the measured brightness. As regards the conventional structure for the automatic exposure function, a light-reception element (a photo electric element, a photo detector) in a section for measuring the brightness of an observation image, that is, a photometric area, has a fixed shape.

Observation images acquired by microscopes, however, have various shapes depending on observation methods or subjects (samples). If only a fixed area is photometrically measured, an optimal exposure time cannot be obtained. For example, depending on the types of microscopes, there are many cases where samples are distributed only in ranges less than photometric areas (light-reception areas). If such a sample is photographed by the conventional photometric method, the following problems will arise: light is radiated only on an area less than a photometric area (light-reception area), and the other area is treated as a background. This background has a lower brightness in the case of fluorescence observation, etc., and has a higher brightness in the case of bright-field observation, etc.

If a photometric operation is performed under the above-described condition, a total luminance is averaged by the light-reception area and the sample will disappear in the background. Consequently, the actual exposure time will become longer than an optimal exposure time in the case of fluorescence observation, and become shorter than the optimal exposure time in the case of bright-field observation. As a result, the observation image, which is actually desired, will not clearly appear on the produced photograph due to excessive or deficient exposure, and the photographing will fail. Various techniques have been proposed to solve the problems.

Jpn. U.M. Appln. KOKAI Publication No. 61-144443 shows a structure wherein partial photometry and average photometry are mechanically (optically) switched to selectively extract a necessary area of an observation image, and the selected area can be shifted to a desired position within a view field of a microscope to achieve optimal exposure. On the other hand, Jpn. Pat. Appln. KOKAI Publication No. 56-155820 discloses a technique relating to devised calculation of luminance information, wherein a photometric measurement area is divided into a number of portions and the respective associated luminance values are weighted.

Moreover, Jpn. Pat. Appln. KOKAI Publication No. 6-222282 proposes a technique wherein attention is paid, in particular, to the above-mentioned fluorescent sample. According to this technique, a two-dimensional CCD imager is used to achieve optimal exposure even where luminance varies from point to point and there is a large difference in luminance between a necessary area for photometry and the background. Jpn. Pat. Appln. KOKAI Publication No. 7-168103 relates to an improvement of this technique, wherein partial photometry can be performed in any area within the view field of the microscope. Since photometry can be performed by designating a desired location within the view field of the microscope, irrespective of the luminance distribution or locations of samples, optimal exposure time can be calculated for any sample.

As has been described above, there are many proposals for achieving optimal exposure and the photographing apparatuses have been improved.

According to the system of Jpn. U.M. Appln. KOKAI Publication No. 61-144443, however, the mechanical switching of the photometric measurement area makes the structure complex, and the operability for assembly and adjustment is considerably low. In addition, since mechanical movable members are employed, slide surfaces are abraded and contaminant, which is most detrimental to the optical system, will occur. This may adversely affect the photometry or observation system.

In the techniques of Jpn. Pat. Appln. KOKAI Publication No. 56-155820, Jpn. Pat. Appln. KOKAI Publication No. 6-222282 and Jpn. Pat. Appln. KOKAI Publication No. 7-168103, a drive circuit, a data take-in circuit, etc. for taking in data from divided pixels are required and the structure relating to electrical components is complicated. As a result, the size and manufacturing cost of the apparatus will increase.

In particular, where the CCD imager is used as in Jpn. Pat. Appln. KOKAI Publication No. 6-222282, exact photometric operations cannot be performed unless the output characteristics of respective pixels are uniformly corrected. An additional adjustment mechanism for correcting variance is required and the manufacturing cost of the apparatus will further increase. Furthermore, in the technique of Jpn. Pat. Appln. KOKAI Publication No. 7-168103, like Jpn. U.M. Appln. KOKAI Publication No. 61-144443, there are many mechanical drive components and problems of contamination will arise.

It is well known that when an optical system is assembled, the optical axis of the optical system needs to be aligned. When the conventional CCD imager is used, too, the alignment is performed while checking electric signals.

As has been described above, in the conventional photographing apparatuses for microscopes, the mechanical structure and electric circuits are complex and involve an increase in size. Consequently, the adjustment and assembly of the apparatus becomes more difficult, and the manufacturing cost of the apparatus increases.

BRIEF SUMMARY OF THE INVENTION

The object of the present invention is to provide a photometric apparatus for a microscope, wherein operability for assembly and adjustment can be enhanced with low cost, and the precision of photometry is increased.

In order to achieve the object of the invention, there is provided a photometric apparatus for a microscope, the apparatus comprising: a light-reception element having a plurality of concentrically arranged photometric measurement areas, the light-reception element receiving observation light from the microscope and measuring a brightness of an observation image of the observation light; a calculation circuit for calculating an exposure time necessary for photographing the observation image, on the basis of a photometric measurement value obtained from at least one of the plurality of photometric measurement areas of the light-reception element; and a control circuit for performing an exposure operation on the basis of the exposure time calculated by the calculation circuit.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Preferred embodiments of the present invention will now be described with reference to the accompanying drawings.

Figure 1:
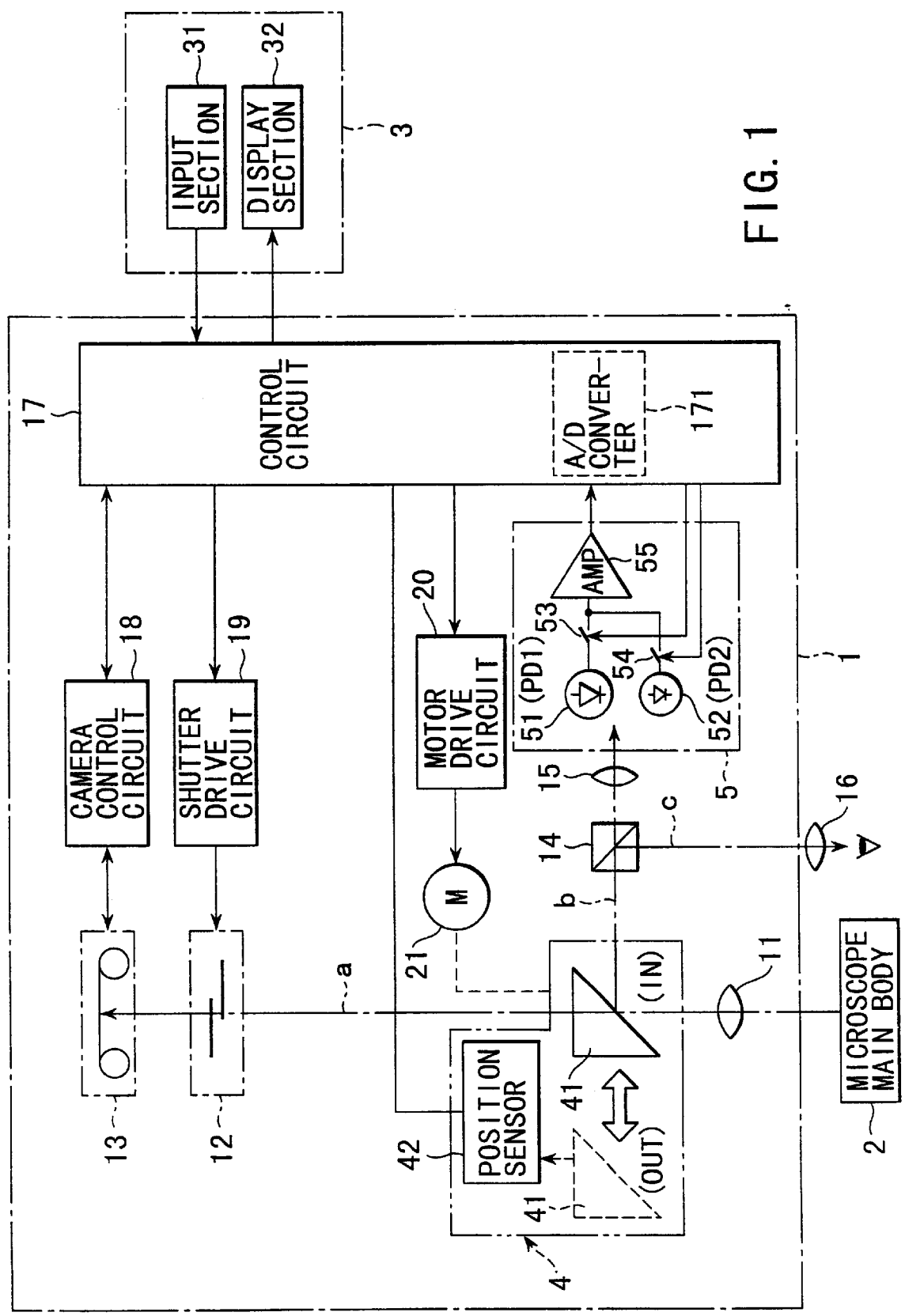
FIG. 1 shows a structure of a microscope to which a photometric apparatus for microscope according to a first embodiment of the present invention is applied.

FIG. 1 shows a structure of a microscope to which a photometric apparatus for microscope according to a first embodiment of the present invention is applied;

In a photographing apparatus main body 1, an observation image of a sample is projected from a microscope main body 2 onto a camera 13 and photographed. In the photographing apparatus main body 1, a projection lens 11, a shutter 12 and the camera 13 are arranged on an observation optical axis a of the microscope main body 2. The observation image from the microscope main body 2 is projected and focused onto a film surface in the camera 13 through the projection lens 11 and shutter 12. An optical path switch device 4 is provided. between the projection lens 11 and the shutter 12.

The optical path switch device 4 comprises a mirror 41, which can be freely shifted onto and away from the observation optical axis a, and a position sensor 42 for detecting the position of the mirror 41. In the state in which the mirror 41 is positioned on the observation optical axis a, an optical path division element 14 comprising a half-mirror, a prism or the like, a reduction correction lens 15 and a light-reception IC 5 are arranged on a reflection optical axis b of the mirror 41. The reduction correction lens 15 corrects a projection magnification of an observation image to be projected on the light-reception IC 5. In the light-reception IC 5, a light-reception element (a photo electric element, a photo detector) (to be described later) photometrically measures the brightness of the observation image passed through the reduction correction lens 15. A focusing lens 16 and a photographing viewer (finder) (not shown) are arranged on a reflection optical axis c of the optical path division element 14. The optical path division element 14 divides the observation image from the microscope main body 2 into a component to be led to the light-reception IC 5 and a component to be led to the photographing viewer.

A control circuit 17 in the photographing apparatus main body 1 is connected to a camera control circuit 18 for controlling the photographing camera 13 and a shutter drive circuit 19 for driving the shutter 12 which adjusts exposure of the camera 13. The control circuit 17 is also connected to the position sensor 42, a motor drive circuit 20 and the light-reception IC 5. The motor drive circuit 20 controls a motor 21 for shifting the mirror 41 onto and away from the observation optical axis a.

The control circuit 17 performs photometric operations on the basis of photometric measurement values output from the light-reception IC 5. The control circuit 17 causes the shutter drive circuit 19 to open the shutter 12, thereby controlling the exposure operation of the camera 13. The control circuit 17 also causes the camera control circuit 18 to control the camera 13.

The light-reception IC 5 comprises an average-photometry light-reception element (a photo electric element, a photo detector) (PD1) 51, such as a silicon photodiode, for photometrically measuring a relative large area; a spot-photometry light-reception element (a photo electric element, a photo detector) (PD2) 52, such as a silicon photodiode, for photometrically measuring only a small area (an extremely small area); selector switches (SW) 53 and 54, such as analog switches, for switching the average-photometry light-reception element 51 and spot-photometry light-reception element 52; and an amplifier 55 for amplifying an analog signal from either the average-photometry light-reception element 51 or spot-photometry light-reception element 52, thereby enabling the amplified signal to be processed in the control circuit 17.

The control circuit 17 comprises a conventional CPU circuit and peripheral devices, and has a circuit configuration including a CPU, a ROM, a RAM, an oscillator and other necessary peripheral circuits. The control circuit 17 also includes an A/D converter 171 for converting the analog signal from the light-reception IC 5 to a digital signal, and a non-volatile memory for storing various set values. A controller 3 provides operational instructions to the control circuit 17. The controller 3 comprises an input section 31 provided with various switches, and a display section 32, such as a liquid crystal display, for displaying various information set by the switches in the input section 31 as well as various information relating to the control circuit 17.

The input section 31 is provided with an exposure start switch for starting an exposure operation; a photometric measurement area change-over switch for switching the average-photometry light-reception element 51 and spot-photometry light-reception element 52, thereby designating the area for photometry; and a switch for inputting conditions necessary for photographing.

Figure 2:
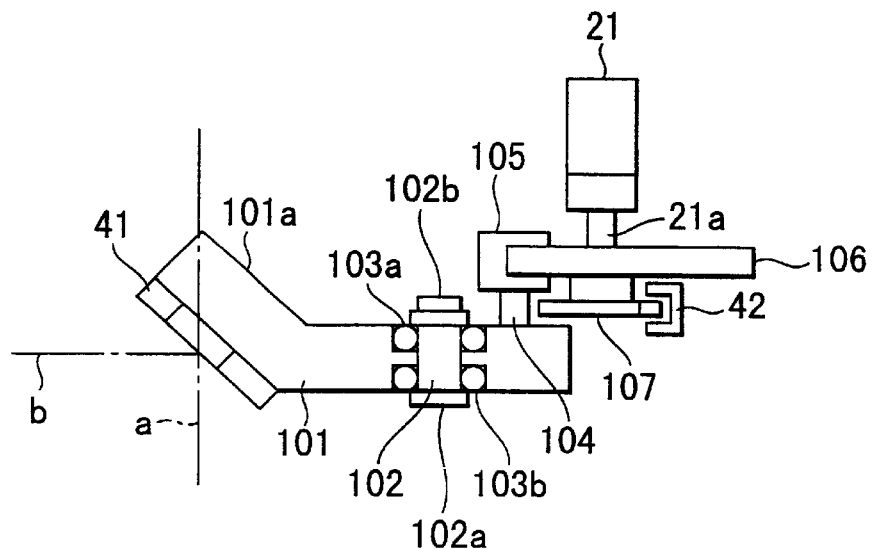
FIG. 2 is a side view showing a structure of an optical path switch device according to the first embodiment of the invention.
Figure 3A:
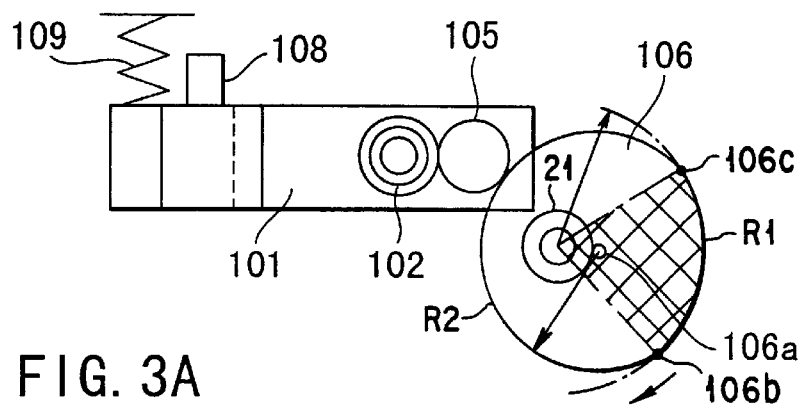
FIG. 3A is a plan view showing the structure of the optical path switch device according to the first embodiment of the invention.
Figure 3B:
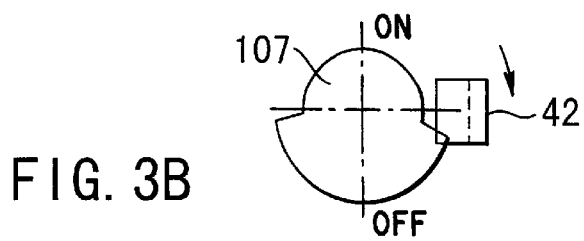
FIG. 3B is a plan view of a signal plate and a photo-interrupter according to the first embodiment of the invention.
Figure 4A:
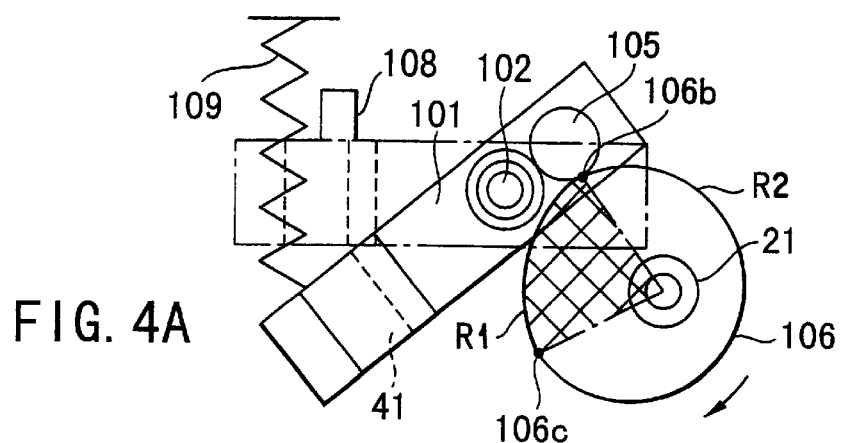
FIG. 4A is a plan view showing the structure of the optical path switch device according to the first embodiment of the invention.
Figure 4B:
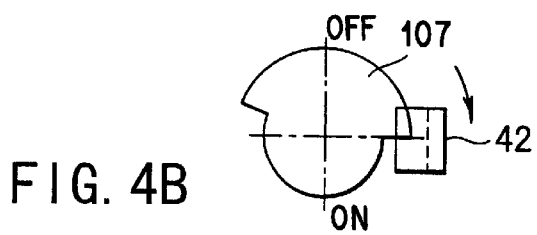
FIG. 4B is a plan view of the signal plate and photo-interrupter according to the first embodiment of the invention.
Figure 5A:
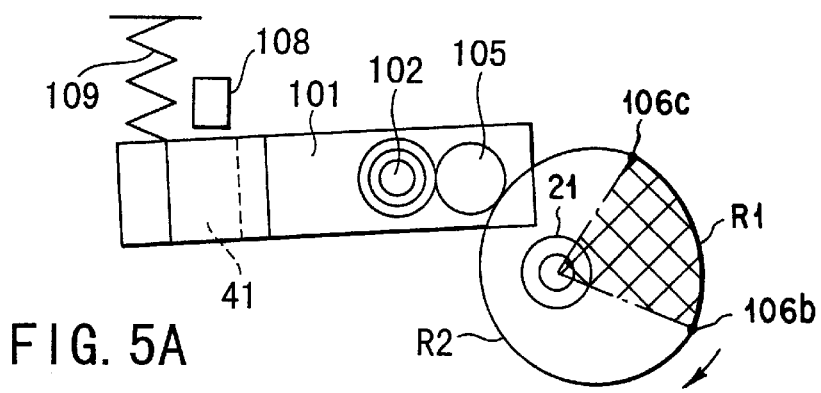
FIG. 5A is a plan view showing the structure of the optical path switch device according to the first embodiment of the invention.
Figure 5B:
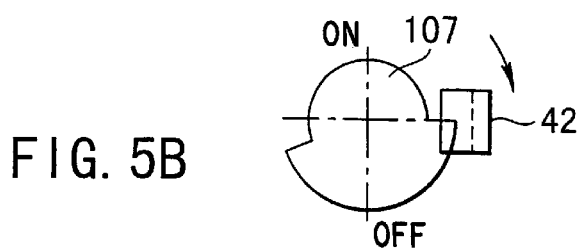
FIG. 5B is a plan view of the signal plate and photo-interrupter according to the first embodiment of the invention.

FIG. 2 is a side view showing a structure of the optical path switch device 4. FIG. 3A is a plan view showing the structure of the optical path switch device 4, and FIG. 3B is a plan view of a signal plate and a photo-interrupter. FIG. 4A is a plan view showing the structure of the optical path switch device 4, and FIG. 4B is a plan view of the signal plate and photo-interrupter. FIG. 5A is a plan view showing the structure of the optical path switch device 4, and FIG. 5B is a plan view of the signal plate and photo-interrupter. The common structural elements are denoted by like reference numerals in FIGS. 1, 2, 3A, 3B, 4A, 4B, 5A and 5B.

In FIG. 2, a distal end portion 101a of a rotary member 101 is bent upward over 45°, and a bottom surface of the bent distal end portion 101a is provided with the mirror 41. The rotary member 101 is supported on the photographing apparatus main body 1 so as to be rotatable on a shaft 102. Bearings 103a and 103b serving as slidable movement members are fitted on the shaft 102. The bearings 103a and 103b are fixed by a shaft portion 102a and a nut portion 102b. A shaft 104 is erected on a proximal end portion of the rotary member 101, which is located opposite to the bent distal end portion 101a in respect to the shaft 102. A bearing 105 is fitted on a distal end portion of the shaft 104.

On the other hand, a cam 106 and a signal plate 107 are integrally attached to a rotary shaft 21a of the motor 21. The cam 106 and signal plate 107 are rotated on the same axis. The cam 106 is so disposed that it can be put in contact with the bearing 105 of the shaft 104. As is shown in FIG. 3A, the circumference of the cam 106 is defined by a curve R1, which constitutes a part of a circle whose center coincides with the center of rotation of cam 106, and a curve R2 constituting a part of a circle whose center is a point 106a eccentric to the center of rotation of cam 106. In FIG. 3, the part of the circle whose center coincides with the center of rotation of cam 106 is indicated by shading lines.

When the rotary shaft 21a is rotated, the cam 106 comes in contact with the bearing 105 only in a predetermined range of rotational angles, thereby transmitting a torque to the rotary member 101 via the shaft 104.

As is shown in FIG. 3B, the signal plate 107 has a shape obtained by combining two discs with different diameters. The signal plate 107 is used in combination with the position sensor 42 comprising a photo-interrupter. If the rotary shaft 21a is rotated and a large-diameter portion of the signal plate 107 enters the position sensor 42, light in the photo-interrupter is interrupted. The control circuit 17 receives a signal from the position sensor 42. When light in the position sensor 42 is interrupted by the signal plate 107, the position sensor 42 outputs an off-signal. In other cases, the position sensor 42 outputs an on-signal. When the on-signal is changed to the off-signal or when the off-signal is changed to the on-signal, the control circuit 17 causes the motor drive circuit 20 to stop the motor 21.

A stopper 108 and a tension spring 109 are disposed on a side region of the bent distal end portion 101a of the rotary member 101. The tension spring 109 rotationally urges the entire rotary member 101 in such a direction as to bring the bearing 105 of shaft 104 into contact with the cam 106. The stopper 108 positions the rotationally urged rotary member 101.

The operation of the optical path switch device 4 with the above structure will now be described. As is shown in FIG. 3A, in the state in which the rotary member 101 is rotationally urged by the tension spring 109 and positioned by the stopper 108, incoming light traveling along the optical axis a is reflected by the mirror 41 and then guided along the optical axis b. In addition, the signal plate 107 and position sensor 42 have a positional relationship as shown in FIG. 3B. Light in the position sensor 42 is not interrupted by the signal plate 107, and the position sensor 42 outputs the on-signal.

If a motor drive signal is output from the control circuit 17 to the motor drive circuit 20 in this state, the motor 21 is activated and the cam 106 is rotated clockwise in FIG. 3A by the rotation of the rotary shaft 21a. From a time instant the circumference of. the cam 106 has come in contact with the bearing 105, the cam 106 begins to urge the bearing 105 and accordingly the rotary member 101 begins to rotate on the shaft 102 counterclockwise in FIG. 3A against the urging force of the tension spring 109.

Subsequently, when the bearing 105 has come in contact with a boundary point 106b between the curves R2 and R1 of the cam 106, as shown in FIG. 4A, the output signal from the position sensor 42 changes from the on-signal to the off-signal. In this case, the positional relationship between the signal plate 107 and position sensor 42 is so set that the signal plate 107 may interrupt the light in the position sensor 42, as shown in FIG. 4B.

In response to the change from the on-signal to the off-signal delivered from the position sensor 42, the control circuit 17 outputs a motor stop signal to the motor drive circuit 20. The rotation of the motor 21 is thus stopped and also the rotation of the rotary member 101 is stopped. In this state, the mirror 41 provided on the bent distal end portion 101a of rotary member 101 is positioned away from the optical axis a. Accordingly, the light input along the optical axis a travels straight along the optical axis a.

Even if the motor 21 is overdriven when it is stopped, the bearing 105 remains in contact with the cam 106 in a range of curve R1 whose center coincides with the center of rotation of the cam 106 and the rotary member 101 is kept in the same stop position. Accordingly, the light input along the optical axis a travels straight along the optical axis a. Therefore, high precision for stop of movement is not required for the rotary member 101.

Subsequently, if a motor drive signal is output again from the control circuit 17 to the motor drive circuit 20, the motor 21 is reactivated. The cam 106 is further rotated clockwise in FIG. 4A by the rotation of the rotary shaft 21a, and a boundary point 106c between curves R1 and R2 of the cam 106-passes over the bearing 105. Then, the urging force by the cam 106 on the bearing 105 decreases and the rotary member 101 begins to rotate clockwise on the shaft 102 in accordance with the urging force of the tension spring 109.

In a subsequent phase, as shown in FIG. 5A, the distance between the rotary member 101 and stopper 108 decreases to a predetermined small value and the cam 106 is about to go out of contact with the bearing 105. At this time, if the positional relationship between the signal plate 107 and the position sensor 42 is so set that the signal plate 107 may interrupt light in the position sensor 42, as shown in FIG. 5B, the output signal from the position sensor 42 changes from the on-signal to the off-signal and the rotation of the motor 21 is stopped. If the cam 106 has gone out of contact with the bearing 105, the rotary member 101 is pulled by the tension spring 109 until it comes in contact with the stopper 108 and the rotation thereof is stopped.

In this case, since the stop position of the rotary member 101 is exactly determined by the stopper 108, the light input along the optical axis a is reflected once again by the mirror 41 and guided to the optical axis b. Even if the motor 21 is overdriven when it is stopped, the cam 106 is separated from the bearing 105 and the stop position of the rotary member 101 is not affected. Therefore, high precision for rotational control is not required for the motor 21 and rotary member 101. Furthermore, since the range of rotation of the rotary member 101 is small from a time instant when the cam 106 has gone out of contact with the bearing 105 to a time instant when the rotary member 101 has come in contact with the stopper 108, no vibration occurs when the rotary member 101 comes in contact with the stopper 108. No noise occurs due to the optical path switching. Moreover, since the bearing 105 rotates in a tangential direction of the cam 106 and bearing 105, friction of the cam 106 can be reduced. Thereby, stable switching of the optical path can be effected. Since no excess load acts on the motor 21, the motor 21 can be stably driven.

Figure 6:
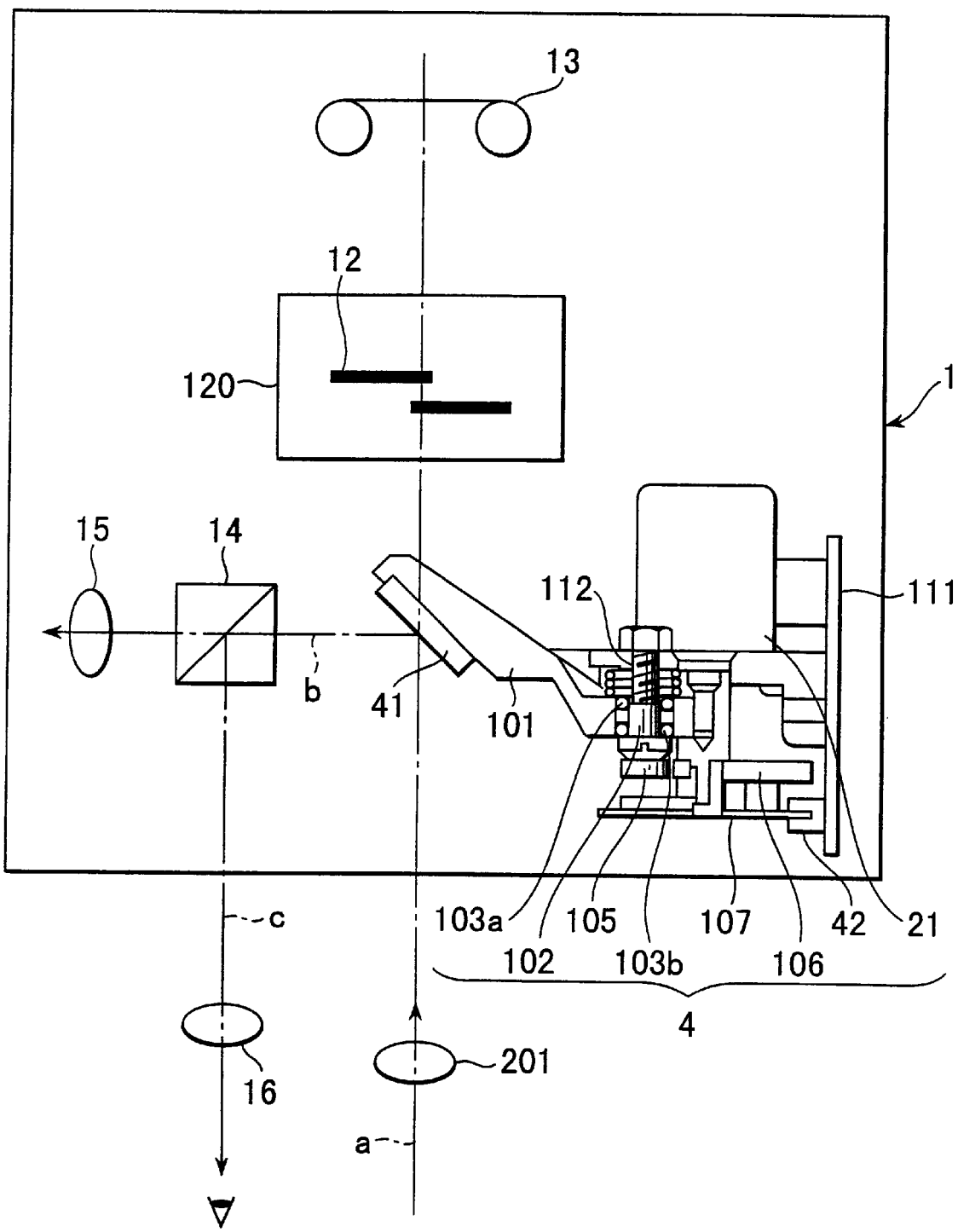
FIG. 6 is a side view showing a structure wherein the optical path switch device according to the first embodiment of the invention is applied to a main body of a photographing apparatus for microscope.
Figure 7:
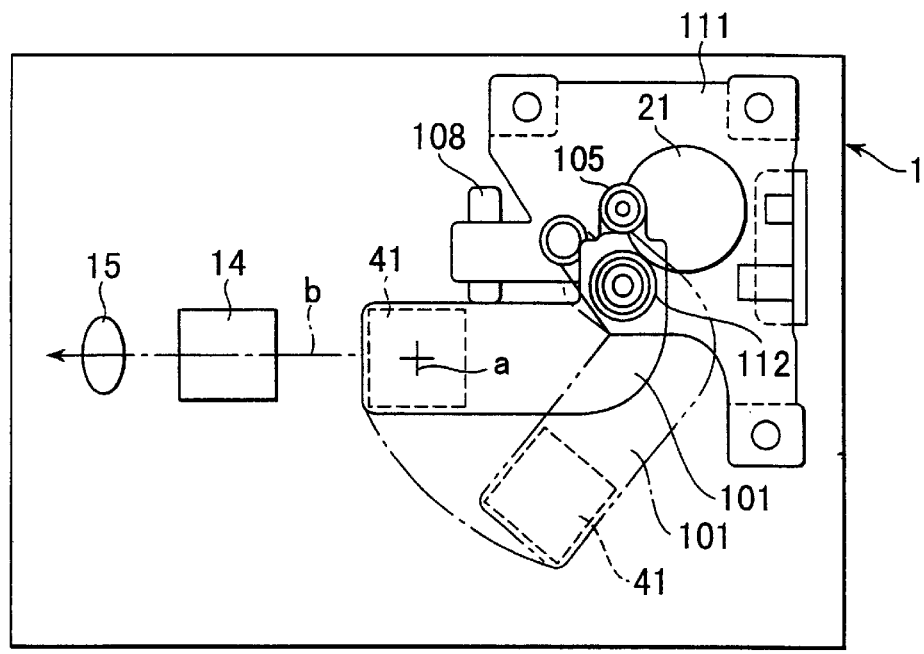
FIG. 7 is a plan view showing a structure wherein the optical path switch device according to the first embodiment of the invention is applied to the main body of a photographing apparatus for microscope.

FIG. 6 is a side view showing a structure wherein the optical path switch device shown in FIGS. 2, 3A and 3B is applied to the photographing apparatus main body 1. FIG. 7 is a plan view showing this structure. In FIGS. 6 and 7, the structural elements common to those shown in FIGS. 1, 2, 3A and 3B are denoted by like reference numerals. For the purpose of convenience, however, the shapes and arrangement of some elements are shown in different ways between the Figures. In FIGS. 6 and 7, the above-described optical path switch device 4 is incorporated in the photographing apparatus main body 1 for microscope.

In the optical path switch device 4, the rotary member 101 is attached to a support 111 via the shaft 102. Circuit boards for the motor 21 and position sensor 42 are also attached to the support 111. The aforementioned tension spring 109 for rotationally urging the rotary member 101 is replaced with a torsion spring 112 which is provided between the support 111 and the rotary member 101.

An objective lens 201 for focusing an image of a sample set in the microscope main body 2 is disposed on the optical axis a of the microscopic observation optical path leading to the mirror 41 attached to the rotary member 101 of optical path switch device 4. The aforementioned optical path division element 14 is disposed on the optical axis b of the reflection optical path of the mirror 41. The optical path division element 14 divides light into a light component of 80% and a light component of 20%. The reduction correction lens 15 and light-reception IC 5 are arranged on the optical axis b of one of the divided optical paths, to which the light component of 80% is guided. The focusing lens 16 and photographing viewer (finder) (not shown) are arranged on the optical axis c of the other divided optical path to which the light component of 20% is guided.

The shutter 12 for exposure and the camera 13 for photographing the microscopic observation image are disposed on the optical axis a of the observation optical path, which extends straight from the objective lens 201 when the mirror 41 is shifted away from the optical axis a. The shutter 12 is attached to the photographing apparatus main body 1 by means of a shutter frame 120.

In this photographing apparatus for microscope, the rotary member 101 of optical path switch device 4 is normally positioned as shown in FIGS. 6 and 7. If light coming in along the optical axis a of the microscopic observation optical path is made incident on the mirror 41 via the objective lens 201 and reflected by the mirror 41, the light is divided into an 80% component and a 20% component. The brightness of the sample for microscope is measured by the light-reception IC 5 on the basis of the light guided through the said one divided optical path, and the exposure time necessary for photographing is determined by the control circuit 17. On the basis of the light guided through the said other divided optical path, framing or focusing is performed through the photographing viewer (finder).

If the optical path switch device 4 is driven and the rotary member 101 is rotated to a position indicated by a two-dot-and-dash line in FIG. 7, the light from the objective lens 201 on the optical axis a of the microscopic observation optical path travels straight along the optical axis a of the photographing optical path. The light is then input to the camera 13 via the shutter 12 which is opened only for an exposure time and thus the microscopic observation image is photographed.

Figure 8:
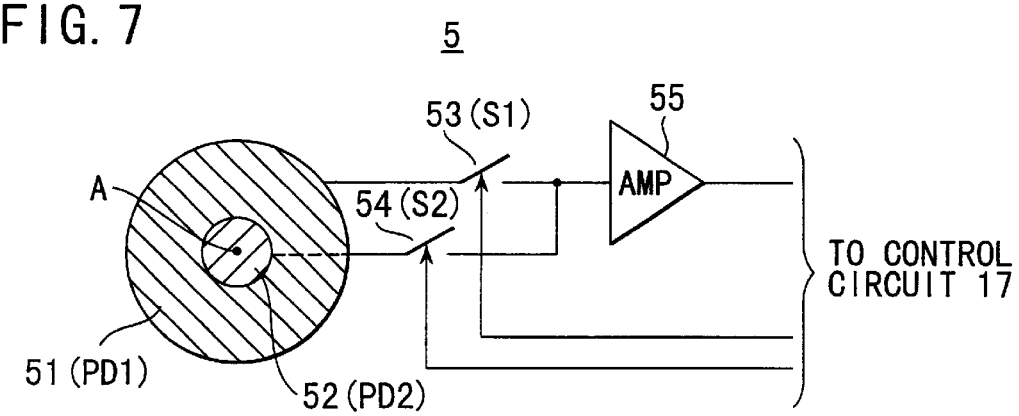
FIG. 8 shows an internal structure of a light-reception IC according to the first embodiment of the invention.

FIG. 8 shows an internal structure of the light-reception IC 5. Light-reception surfaces of the light-reception IC 5 (i.e. average-photometry light-reception element 51 and spot-photometry light-reception element 52) are concentrically arranged in respect of a point A, as shown in FIG. 8. The spot-photometry light-reception element 52 is situated inside, and the average-photometry light-reception element 51 is situated outside. The average-photometry light-reception element 51 is connected to the amplifier 55 via the selector switch 53, and the spot-photometry light-reception element 52 is connected to the amplifier 55 via the selector switch 54. The selector switches 53 and 54 and amplifier 55 are connected to the control circuit 17.

Figure 9A:
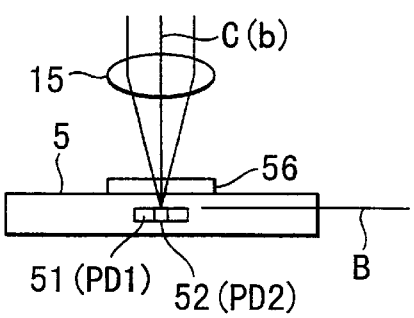
FIG. 9A is a side view showing the internal structure of the light-reception IC according to the first embodiment of the invention.
Figure 9B:
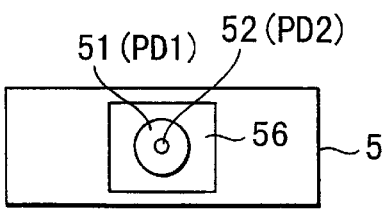
FIG. 9B is a plan view showing the internal structure of the light-reception IC according to the first embodiment of the invention.

FIG. 9A and FIG. 9B show the internal structure of the light-reception IC 5. FIG. 9A is a side view and FIG. 9B is a plan view. In the light-reception IC 5, as shown in FIG. 9A, a light beam converged by the reduction correction lens 15 is corrected and focused on an upper surface (focal plane B) of the light-reception element. A light-transmissive transparent member 56 of glass, etc. is provided on the surface of the light-reception IC 5 so that the light beam is radiated on the light-reception element provided inside the light-reception IC 5. In this case, an optical axis C (corresponding to optical axis b) is aligned with the central point A of the spot-photometry light-reception element 52.

Figure 10A:
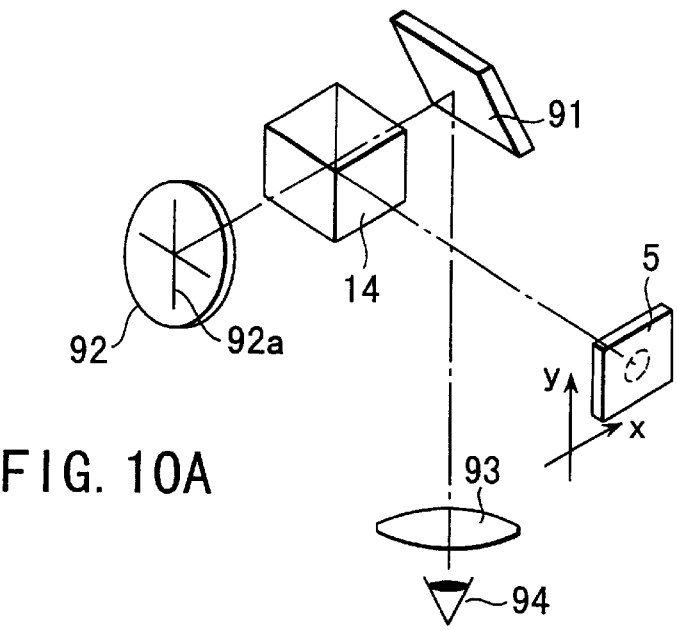
FIG. 10A is a view for describing optical-axis alignment according to the first embodiment of the invention.
Figure 10B:
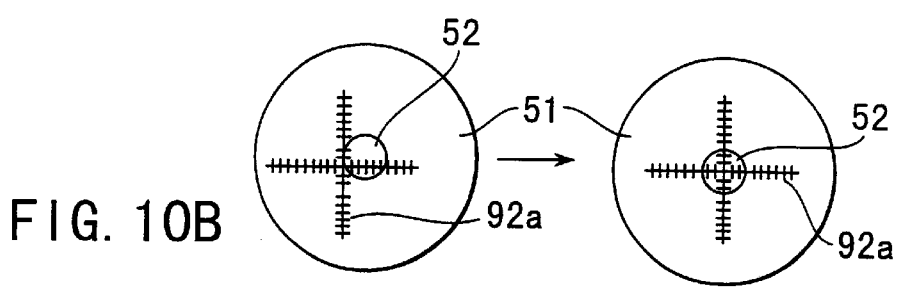
FIG. 10B is a view for describing optical-axis alignment according to the first embodiment of the invention.

FIGS. 10A and 10B are views for describing the adjustment of the optical axis. In FIGS. 10A and 10B, reference numeral 91 denotes an optical reflection member such as a mirror; 14 the optical path division element; 5 the light-reception IC; 92 a viewer-side reticle plate; 92a a reticle printed on the viewer-side reticle plate 92; 93 a projection lens; 94 an operator (the eye); 51 the average-photometry light-reception element; and 52 the spot-photometry light-reception element.

Assume that the centers of the spot-photometry light-reception element 52 and average-photometry light-reception element 51 will be aligned with the center of the reticle 92a printed on the viewer-side reticle plate 92.

An image of the reticle 92a passes through the optical path division element 14 and is reflected by the optical reflection member 91. The reflected image is focused at the operator 94 via the projection lens 93. On the other hand, an image of the-light-reception IC 5 is reflected by the optical path division element 14, reflected once again by the optical reflection member 91, and focused at the operator 94 via the projection lens 93. Thus, the operator 94 can observe the images of the reticle 92a and light-reception IC 5 as if they were on the same plane, as shown in FIG. 10B.

When the center of the spot-photometry light-reception element 52 does not coincide with the center of the reticle 92a, as shown in a left portion of FIG. 10B, the light-reception IC 5 is adjusted in the x- and y-directions so that both centers may coincide as shown in a right portion of FIG. 10B. Thus, the center of the reticle 92a is aligned with the center of the spot-photometry light-reception element 52. At the same time, the center of the average-photometry light-reception element 51 can be aligned easily and exactly with the center of the reticle 92a, since the average-photometry light-reception element 51 is concentric with the spot-photometry light-reception element 52.

The operation of the microscope with the above structure will now be described. To begin with, a description will be given of a case where a sample to be observed is larger than the photometric measurement area (light-reception area) of the average-photometry light-reception element 51. In general, where the sample is uniform over the entire view field, photometric measurement is performed on an area corresponding to 30% to 40% of the film area. Accordingly, in the case of the observation image reduced by the reduction correction lens 15, too, the area corresponding to 30% of the film area is radiated on the average-photometry light-reception element 51.

Figure 11:
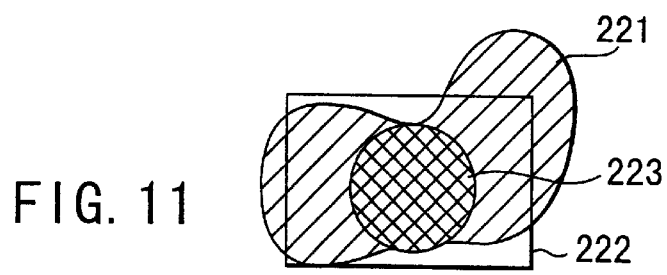
FIG. 11 shows a relationship among a sample, an average photometric measurement area and a photographing area in the first embodiment of the invention.

FIG. 11 shows a relationship among a sample, an average photometric measurement area and a photographing area.

Where a sample 221 as shown in FIG. 11 is to be photometrically measured, it is desirable to adopt average photometry since the sample extends over the entire surface of an average photometric measurement area 223, i.e. the entire surface of average-photometry light-reception element 51. The operator operates the photometric measurement area change-over switch (not shown) in the input section 31 and designates the average photometry mode. The control circuit 17 switches the photometry mode to the average photometry mode in accordance with the instruction from the input section 31. At this time, the mirror 41 of the optical path switch device 4 is positioned on the optical axis a.

The control circuit 17 instructs the light-reception IC 5 to turn off the selector switch 54 and turn on the selector switch 53. In accordance with the instruction from the control circuit 17, the light-reception IC 5 operates the selector switches 53 and 54. Then, a signal indicative of a photometric value from the average-photometry light-reception element 51 is input to the amplifier 55 via the selector switch 53.

Observation light (observation image) from the microscope main body 2 is reflected by the mirror 41, and divided by the-optical path division element 14. One of the divided components is corrected by the reduction correction lens 15 and led to the light-reception IC 5. At this time, this component of the observation light divided by the optical path division element 14 is projected onto both the average-photometry light-reception element 51 and spot-photometry light-reception element 52 of the light-reception IC 5. However, since the output from the average-photometry light-reception element 51 is made effective by the above-described operation, only the output from the average-photometry light-reception element 51 is input to the amplifier 55. The control circuit 17 reads the output from the amplifier 55 and performs photometric arithmetic operations (calculations) according to commonly known photometric formulae on the basis of the read photometric values. Thus, the control circuit 17 calculates an exposure time necessary for photographing.

If the operator has input an instruction for photographing through the input section 31, the photographing operation is performed with the exposure time calculated by the control circuit 17. At this time, the control circuit 17 causes the motor drive circuit 20 to output the motor drive signal, thereby driving the motor 21. Thus, the mirror 41 of optical path switch device 4 is shifted away from the optical axis a. in the photographing operation, the control circuit 17 first delivers a signal to the shutter drive circuit 19. The shutter drive circuit 19 then opens the shutter 12. If the shutter 12 is opened, observation light is radiated on the film in the camera 13 and the exposure begins. If the calculated predetermined exposure time has passed, the control circuit 17 instructs the shutter drive circuit 19 to close the shutter 12. If the shutter 12 is closed, the control circuit 17 instructs the camera control circuit 18 to wind up the film in the camera 13. Upon completion of the winding up of the film in the camera 13, the sequence of exposure operations are finished.

Figure 12:
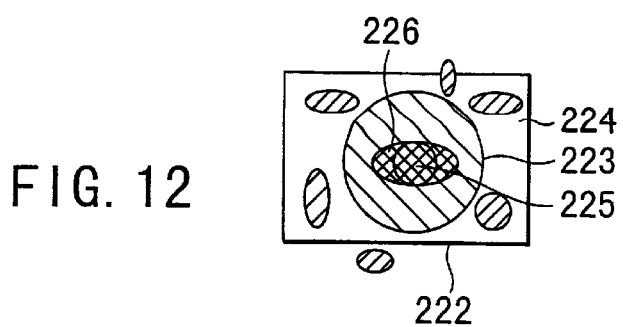
FIG. 12 shows a relationship among a sample, an average photometric measurement area, a spot photometric measurement area and a photographing area in the first embodiment of the invention.

FIG. 12 shows a relationship among a sample, an average photometric measurement area, a spot photometric measurement area and a photographing area. A description will now be given of a case where samples (sample portions) are discretely present as shown in FIG. 12. Each of the samples corresponds to an area to be photographed, such as a fluorescent observation sample, which is smaller than the photometric measurement area (light-reception area) of the average-photometry light-reception element 51.

Where a fluorescent sample such as sample 226 is discretely present in the photographing area, a background 224 is black in general. If photometry is performed with an average photometric measurement area 223 in this state and the exposure is effected with the calculated exposure time, the sample 226 disappears in the background 224 and a photograph with over-exposure is produced. Under the circumstances, a need arises to switch the photometric measurement area to a spot photometric measurement area 225 in accordance with the size of the sample 226. When the photometric measurement area is to be switched, the operator provides an instruction by operating the photometric measurement area change-over switch (not shown) in the input section 31, in the same manner as described above.

Upon the instruction for switching, the control circuit 17 turns off the selector switch 53 in the light-reception IC 5 and turns on the selector switch 54. In a manner reverse to the above, the output from the spot-photometry light-reception element 52 is selected and the amplifier 55 outputs a spot-photometry value. Thereby, only the portion to be photographed can be photometrically measured and photographing can be effected with optimal exposure. When the sample is not located in the spot photometric measurement area 225, the operator shifts the entire sample body including sample portions so that one or more sample portions are located in the spot photometric measurement area 225. The actual photographing operation is the same as described above, and a description is not repeated.

According to the first embodiment, the photometric measurement area is electrically switched and the number of mechanical parts in the photometric apparatus can be reduced. Thus, vibration and contamination due to switching operations can be reduced. Moreover, since the number of mechanical portions is small, there occurs no degradation due to abrasion, etc. and the durability and reliability of the apparatus is enhanced. Since the photometric measurement area is electrically switched, no time for physical movement is needed and the switching speed is increased. In addition to these advantages, by virtue of the concentric arrangement of photometric measurement areas, the optical axis alignment for all photometric measurement areas, which is indispensable in optical devices, can be completed only by effecting optical axis alignment for a smallest photometric measurement area (spot-photometry light-reception element 52 in the first embodiment). Thus, the photometric apparatus with a small number of alignment operation steps and a simple structure can be provided. Furthermore, since the structure is simple, the manufacturing cost is very low and high-precision photographing can be performed.

Figure 13:
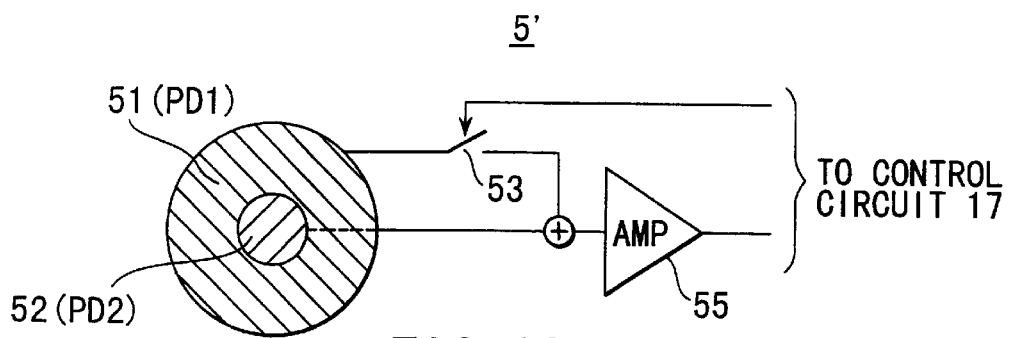
FIG. 13 shows an internal structure of a light-reception IC in a microscope to which a photometric apparatus for microscope according to a second embodiment of the present invention is applied.

FIG. 13 shows an internal structure of a light-reception IC 5' in a microscope to which a photometric apparatus for microscope according to a second embodiment of the present invention is applied. The light-reception IC 5 is substituted for the light-reception IC 5 in the photometric apparatus for microscope shown in FIG. 1. Except for the light-reception IC, the structural elements in the microscope according to the second embodiment are the same as those shown in FIG. 1. The structure and operation of the second embodiment are substantially the same as those of the first embodiment. However, a mechanism for switching the average-photometry light-reception element 51 and spot-photometry light-reception element 52 is improved.

In FIG. 13, the average-photometry light-reception element 51 is connected to the amplifier 55 via the selector switch 53. The spot-photometry light-reception element 52 is connected to the amplifier 55. The selector switch 53 and amplifier 55 are connected to the control circuit 17.

As is shown in FIG. 13, the average-photometry light-reception element (PD1) 51 and spot-photometry light-reception element (PD2) 52 are concentrically arranged, similarly with the first embodiment. However, there is a difference in the processing between the outputs from the light-reception elements 51 and 52 and the amplifier 55. In the first embodiment, either the average-photometry light-reception element 51 or spot-photometry light-reception element 52 is selected to be used. In the second embodiment, however, the output from the spot-photometry light-reception element 52 is always kept in the on-state. The output from the average-photometry light-reception element 51 alone is switched on/off.

For example, where the photometric measurement area of the average-photometry light-reception element 51 is set at 30% of the photographing area and the photometric measurement area of the spot-photometry light-reception element 52 is set at 1% of the photographing area, the 1% area of the spot-photometry light-reception element 52 is included in the 30% area of the average-photometry light-reception element 51 since the average-photometry light-reception element 51 and spot-photometry light-reception element 52 are concentrically arranged. If the average-photometry light-reception element 51 and spot-photometry light-reception element 52 are switched, the central 1% area becomes an area which is not measures for average photometry (i.e. the 29% area is measured for photometry). As a result, a photometric value relating to the area excluding a central portion is obtained. Although an actual error is slight, the error may adversely affect photographing as a photometric error. This problem is solved in the second embodiment. An output from the spot-photometry light-reception element 52 is directly input to the amplifier 55, while an output from the spot-photometry light-reception element 52 is switched on/off by the selector switch 53.

A description will now be given of how the control circuit 17 switches the photometric measurement range in accordance with an instruction from the input section 31. If the operator operates the photometric measurement area change-over switch (not shown) in the input section 31 and designates the spot photometry mode, an instruction for spot photometry is delivered from the input section 31 to the control circuit 17. Then, the control circuit 17 turns off the selector switch 53 of the light-reception IC 5' shown in FIG. 13 and cuts off the output from the average-photometry light-reception element 51. Thereby, the output from only the spot-photometry light-reception element 52 is delivered to the amplifier 55 and the spot photometry can be performed.

On the other hand, if the operator operates the photometric measurement area change-over switch (not shown) in the input section 31 and designates the average photometry mode, an instruction for average photometry is delivered from the input section 31 to the control circuit 17. Then, the control circuit 17 turns on the selector switch 53 of the light-reception IC 5' and renders effective the output from the average-photometry light-reception element 51. Thereby, both outputs from the average-photometry light-reception element 51 and spot-photometry light-reception element 52 are delivered to the amplifier 55. Thus, the output from the amplifier 55, or the photometric value, is a sum of a photometric value obtained by the spot-photometry light-reception element 52 and a photometric value obtained by the average-photometry light-reception element 51. Accordingly, photometry of the entire 30% area lacking no central portion is enabled, as is initially desired. The photometric operation and photographing operation are the same as those in the first embodiment, and a description thereof is omitted.

According to the photometric apparatus for microscope of the second embodiment, the following advantages are obtained in addition to the advantages of the first embodiment. Where the photometric mode is switched, only one selector switch may be operated and the control is remarkably simplified. Moreover, since the structure is simple, the manufacturing cost is low, and the precision in photometry can be enhanced.

In order to perform the above-described photometry for the entire 30% area lacking no central portion, it is possible in the structure shown in FIG. 8 to deliver an instruction for turning on both selector switches 53 and 54 to the light-reception IC 5 from the control circuit 17, when the average photometry mode has been designated. Since the light-reception IC 5 turns on both selector switches 53 and 54 as instructed by the control circuit 17, the amplifier 55 receives through the selector switches 53 and 54 the signals indicative of the photometric values from the average-photometry light-reception element 51 and spot-photometry light-reception element 52.

Figure 14:
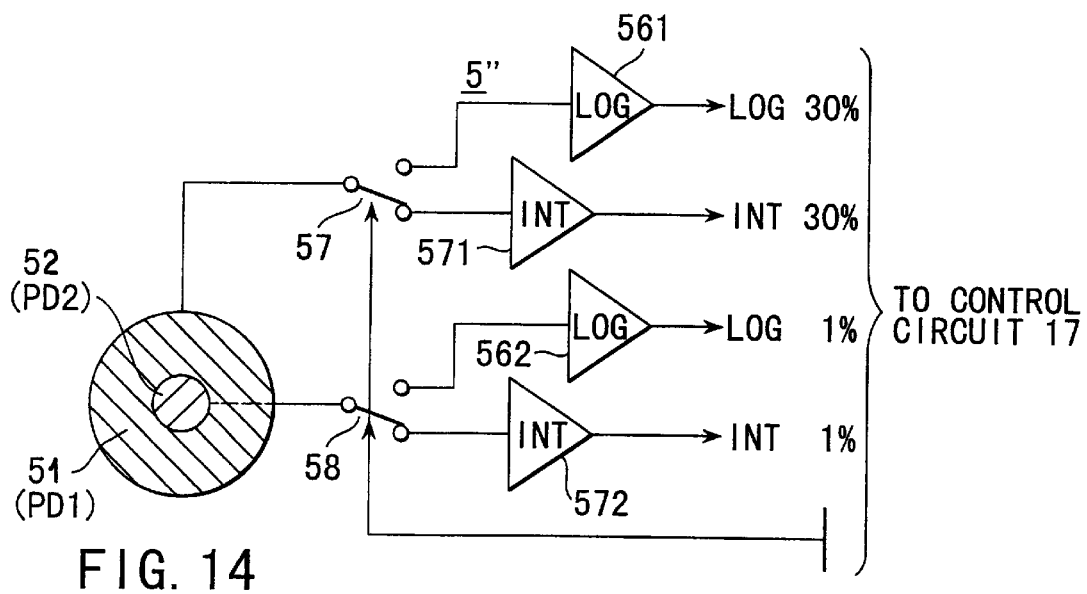
FIG. 14 shows an internal structure of a light-reception IC in a microscope to which a photometric apparatus for microscope according to a third embodiment of the present invention is applied.

FIG. 14 shows an internal structure of a light-reception IC 5" in a microscope to which a photometric apparatus for microscope according to a third embodiment of the present invention is applied. The light-reception IC 5" is substituted for the light-reception IC 5 in the photometric apparatus for microscope shown in FIG. 1. Except for the light-reception IC, the structural elements in the microscope according to the third embodiment are the same as those shown in FIG. 1. The structure and operation of the third embodiment are substantially the same as those of the first embodiment.

In FIG. 14, the average-photometry light-reception element 51 is connected to a LOG amplifier 561 or an integration amplifier 571 via a selector switch 57, and the spot-photometry light-reception element 52 is connected to a LOG amplifier 562 or an integration amplifier 572 via a selector switch 58. The selector switches 57 and 58, LOG amplifiers 561 and 562 and integration amplifiers 571 and 572 are connected to the control circuit 17.

In the description of the first and second embodiments, it is assumed that the amplifier 55 in the light-reception element output stage has the uniform function. Specifically, the amplifier 55 performs the same amplification function for all brightness (luminance of sample) and delivers the output to the control circuit 17. The amplifier 55 is generally provided with a gain control mechanism for varying an amplification factor. In the third embodiment, a plurality of such control mechanisms are provided and a plural stages of gain control can be effected in a switching manner. Thus, amplification with a wide range of gain can be performed, and a photometric range for luminance can be increased.

In the field of microscopes to which the present invention is applied, the range of photometry is very wide and the photometry must be performed in a range of luminance between several hundred [Lx] at maximum and 0.0001 [Lx] or less at minimum. This range depends greatly on the method of observation by microscopes. For example, the luminance is relatively high in the case of general bright-field observation, and it is very low in the case of fluorescence observation or dark-field observation.

If the structure of the first embodiment is applied to the entire range of brightness, there arises no problem for bright samples but there arises a problem for dark samples. If the logarithm amplifier (LOG amplifier) is used in the state in which the output from the light-reception element is low, the S/N radio will deteriorate. In worst cases, signals will disappear in noise and distinction between luminance and noise will become difficult. In such cases, the use of the integration amplifier is advantageous. In the third embodiment, both the LOG amplifier and integration amplifier are provided, and these are switched in accordance with brightness for photometry.

In FIG. 14, the output from the average-photometry light-reception element (PD1) 51 is selectively delivered via the selector switch 57 to either the LOG amplifier 561 or integration amplifier 571. The output from the spot-photometry light-reception element (PD2) 52 is selectively delivered via the selector switch 58 to either the LOG amplifier 562 or integration amplifier 572. The selector switches 57 and 58 are associated with each other and switched by an instruction from the control circuit 17 in accordance with the brightness of the sample.

At the time of photometric arithmetic operations, the control circuit 17 first performs photometric operations with use of the LOG amplifiers 561 and 562. At this time, the selector switches 57 and 58 are turned to the LOG amplifiers 561 and 562. Specifically, like the first and second embodiments, the control circuit 17 confirms the output with the LOG 30% or LOG 1%. Assume that the selection of LOG 30% or LOG 1% has already been determined by the instruction provided by the operator from the input section 31. If the output of LOG 30% or LOG 1% reaches a minimum illuminance (photometric range in the integrator), the control circuit 17 operates the selector switches 57 and 58 and delivers the outputs from the light-reception elements to the INT amplifiers 571 and 572. Thereby, photometric operations at low illuminance can be enabled.

On the other hand, in the operation using INT 30% or INT 1%, the control circuit 17 confirms INT 30% and INT 1% which are outputs from the INT amplifiers 571 and 572. If INT 30% and INT 1% exceed maximum luminance of INT amplifiers 571 and 572, the selector switches 57 and 58 are turned again to the LOG amplifiers 561 and 562. Using LOG 30% or LOG 1%, amplification operations are controlled at all times by optimal methods.

In the first and second embodiments, average photometry and spot photometry are switched in the light-reception IC 5 and an output is delivered to the control circuit 17 from the single output terminal. By contrast, in the third embodiment, outputs are delivered from different output terminals. The control circuit 17 determines one of the output terminals which delivers the associated photometric value to be used. Since the access to the outside is needless when the photometric measurement range is switched, the control is simplified.

Figure 15:
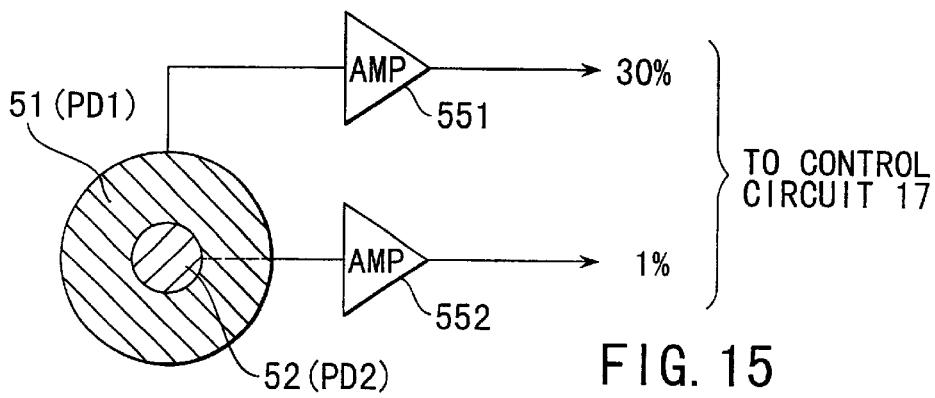
FIG 15 shows an example of the application of the light-reception IC according to the third embodiment of the invention.

FIG. 15 shows an example of the application of the light-reception IC according to the third embodiment of the invention to the first embodiment. The average-photometry light-reception element 51 is connected to an amplifier 551 and the spot-photometry light-reception element 52 is connected to an amplifier 552. The amplifiers 551 and 552 are connected to the control circuit 17.

In FIG. 15, an output from the average-photometry light-reception element (PD1) 51 is delivered to the control circuit 17 via the amplifier 551, and an output from the spot-photometry light-reception element (PD2) 52 is delivered to the control circuit 17 via the amplifier 552. The control circuit 17 determines whether the photometric value from the average-photometry light-reception element 51 or the photometric value from the spot-photometry light-reception element 52 should be used. In this case, too, since the access to the outside is needless when the photometric measurement range is switched, the control is simplified.

It is possible that the selector switches 57 and 58 shown in FIG. 14 are not associated with each other, and one of the selector switches 57 and 58 is opened by the control circuit 17 (i.e. in the state in which the switch is not in contact with either the LOG amplifier or integration amplifier) while the other is turned to either the LOG amplifier or integration amplifier. If the selector switch 57 is effective and the selector switch 58 is opened, LOG 30% or INT 30% alone can be used. If the selector switch 58 is effective and the selector switch 57 is opened, LOG 1% or INT 1% alone can be used. Thereby, like the first embodiment, average photometry and spot photometry can be switched and the amplification operation can be controlled.

According to the third embodiment, as described above, the amplifiers in the output stage can be switched and controlled in accordance with the brightness of the sample to be measured. Thereby, the optimal photometric value can be provided for a darker sample. In addition, the advantages of the first and second embodiments can be obtained.

The present invention is not limited to the above embodiments, and various modifications can be made without departing from the spirit of the invention. For example, the controller 3 is separated from the photographing apparatus main body 1 in the embodiments. However, the controller 3 may be incorporated into the photographing apparatus main body 1 as one unit. The same applies to the microscope main body 2. All elements can be incorporated in the photographing apparatus main body 1.

In each of the embodiments, the optical path switch device 4 is provided and the mirror 41 is shifted onto or away from the observation optical axis a. Thus, the optical path is switched in accordance with the photometry mode and the photographing mode. However, the observation image can be delivered at all times to the camera 13 and the light-reception IC 5. In this case, the optical path switch device 4 is replaced with an optical path division element comprising a half-mirror, a prism, etc. which is provided on the observation optical axis a, and the microscopic observation light is divided into, e.g. an 80% component and a 20% component. The shutter 12 and camera 13 are disposed on the optical axis a of one of the divided optical paths, through which the 80% component is guided. The reduction correction lens 15 and light-reception IC are disposed on the optical axis b of the other optical path through which the 20% component is guided. In this case, the motor drive circuit 20 and motor 21 are omitted.

As regards the actual photometric measurement areas, two areas of 30% and 1% have been described. However, three or more photometric measurement areas may be concentrically arranged and the same operational advantages can be obtained. The same applies to the photometric methods. The same advantages can be obtained if two or more kinds of photometric sections with different characteristics are provided, aside from the LOG amplification and integration amplification.

As has been described above, with the photometric apparatus for microscope according to the present invention, the photometric measurement areas are concentrically arranged and thus the alignment of the light-reception elements is completed if photometric alignment is effected for a smallest area alone. Specifically, the optical axis alignment for all photometric measurement areas, which is indispensable in optical devices, can be completed only by effecting optical axis alignment for a smallest photometric measurement area. Thus, the photometric apparatus with a small number of alignment operation steps and a simple structure can be provided. Furthermore, the structure is simple, and the manufacturing cost is very low.

In addition, with the photometric apparatus for microscope according to the present invention, only an area to be photographed can be photometrically measured by switching a plurality of photometric measurement areas. Photographing can be performed with optimal exposure. In addition, the photometric measurement area is electrically switched and the number of mechanical movement parts in the apparatus can be reduced. Thus, the influence of vibration and contamination due to switching operations can be reduced. Moreover, since the photometric measurement area is electrically switched, no time for physical movement is needed and the switching speed is increased.

According to the photometric apparatus for microscope of the present invention, the photometric system can be switched in accordance with the sample (subject) to be photometrically measured. Specifically, the amplifiers, etc. of the output stage can be switched and controlled in accordance with the brightness of the sample to be measured. Thereby, an optimal photometric value can be provided for a darker sample, and high-precision photographing can be performed.

The present invention can provide a photometric apparatus for microscope, wherein the operability for assembly and adjustment is enhanced, the cost is reduced, and photometric precision is improved.

The present invention is not limited to the above embodiments and various modifications can be made without departing from the spirit of the invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A photometric apparatus for a microscope, the apparatus comprising:

a photographing shutter disposed on an optical axis of an observation light from a microscope main body;

a mirror disposed closer to the microscope main body than said photographing shutter is to the microscope main body, said mirror being freely shifted onto and away from the optical axis;

a rotary member rotatably supported by a rotation axis holding said mirror and parallel to the optical axis;

a spring which urges said rotary member to rotate;

a stopper which positions said rotary member by coming into contact with said rotary member;

a cam which rotates said rotary member by pushing so as to separate said rotary member from said stopper;

a motor which rotatably drives said cam;

a light-reception element disposed on an optical axis of light reflected by said mirror and performing photometric measurement on the observation light, wherein, in a state in which said rotary member is positioned by said stopper, said mirror is shifted on the optical axis, the observation light is guided to said light-reception element, and photometric measurement is performed, and wherein, in a state in which said rotary member is rotated by said cam to a position separated from said stopper, said mirror is shifted away from the optical axis and the observation light is guided to said shutter.

2. The photometric apparatus according to claim 1, wherein said rotary member includes a bearing for bearing a pressure from said cam, and said cam is separated from the bearing in a state in which said rotary member is positioned by said stopper.

3. The photometric apparatus according to claim 1, further comprising a position detecting section which detects each of a position of said rotary member when said rotary member is positioned by said stopper and a position of said rotary member when said rotary member is separated from said stopper.

4. The photometric apparatus according to claim 1, wherein said light-reception element includes a plurality of photometric measurement areas consisting only of a first photometric measurement area having a circular shape and a second photometric measurement area surrounding and concentric with the first photometric measurement area.

5. An optical path-switching apparatus which switches between a first state where an optical path is linear and a second state where the optical path is bent by a mirror, the apparatus comprising:

a mirror insertable into, and movable away from the optical path;

a rotary member rotatably supported by a rotating shaft which holds the mirror and which is parallel to the optical path;

a spring which applies the rotary member with an urging force acting in a rotating direction;

a stopper which positions the rotary member when the rotary member comes into contact therewith;

a cam which rotates the rotary member by pushing, so as to seperate the rotary member from the stopper; and a motor which rotates the cam, wherein, in a state in which the rotary member is positioned by the stopper, the mirror is inserted in the optical path, thereby switching into the second state, and wherein, in a state in which the rotary member is rotated by the cam to a position separated from the stopper, the mirror is shifted away from the optical path, thereby switching into the first state.

6. An optical path-switching apparatus according to claim 5, wherein the rotary member includes a bearing to which a pushing force is applied by the cam, and the cam separates from the bearing in a state where the rotary member is positioned by the stopper.

7. An optical path-switching apparatus according to claim 5, wherein the rotary member includes a position detecting section which detects a position where the rotary member is positioned by the stopper, and a position where the rotary member is separate from the stopper.

* * * * *